Patented Sept. 15, 1953

2,652,379

UNITED STATES PATENT OFFICE 2,652,379

SOIL ADDITIVE

Ross M. Hedrick and David T. Mowry, Dayton, Ohio, assignors to Monsanto Chemical Company, St. Louis, Mo., a corporation of Delaware No Drawing. Application May 24, 1951,
Serial No. 228,136

7 Claims. (Cl. 260—41)

The present invention relates to methods of improving the physical structure of soils. More specifically the invention relates to soil improvements for increasing crop yields and preventing natural erosion.

The ultimate utility and the beneficial properties of top soils and soils of subsurface strata depend substantially upon the physical structure of that soil. Although most soils have a fine state of sub-division necessary to support growing plants, many do not have other physical properties which enable the proper growth and development of the plant structures, and the proper performance of the various plant functions. In addition to the plant nutrients a soil must provide a continuous supply of both air and moisture. Soils of poor structure may become waterlogged during wet seasons, which state excludes the air necessary for optimum growth and development of the plant. Soils of poor structure may lose moisture too rapidly by evaporation from the surface due to excessive capillary action, and plants growing therein will be deprived of the required continuous and abundant supply of moisture. The latter effect becomes excessive in closely compacted soils where also the growth of roots and stems are retarded due to the difficulty of penetration. Furthermore, soils of poor structure frequently experience poor germination of seeds planted therein due to the lack of either air or moisture required for normal germination.

It is also well known that soils of poor structure are subject to erosion, because when subjected to rainfall they soon become saturated and the excess moisture flows across the surface of the soil or in a confined channel. This surface water washes away the fine soil particles and results in the displacement of large quantities of valuable soils. The quantity of surface water is increased both by the failure of the soil to absorb surface water and by the failure of the soil to provide a medium for transferring the water to underlying bodies of soil or to natural water courses.

The problem of increasing the tilth of soils and the problem of preventing erosion may both be solved, or the harmful aspects diminished greatly, by providing a means of improving the physical structure of the soil. When soil is plowed and raked it is possible to provide a loose structure which retains moisture better and contains sufficient air for the propagation of plants. The improvement of soil structure by the tillage is not long lasting and the action of rain and sun will soon cause the soil to slake down and dry out, thereby losing its desirable properties. If soil is cultivated over a number of years and especially if organic fertilizers are added thereto, the soil may gradually attain good structure of more permanent nature. This improvement in the structure is believed to be due to various humus materials, including polysaccharides, generated by the soil bacteria which decompose the organic additives. The improved soil structure enables larger quantities of air to be present and permits the maintenance of a more uniform supply of moisture in the soil, thereby providing a more suitable medium for the further culturing of soil bacteria. By this process the soil structure is improved by a cumulating process. Since clay and heavy loam soils may require many years to develop a satisfactory structure, it is desirable to provide a means of accelerating the formation of fertile soils. The development of good structure by intensive mechanical cultivation is not only short-lived but is frequently deleterious to the growing plants, due to the severance of the shallow feeder roots. If permanently improved structure could be obtained without the mechanical breaking of the surface layers, the rate of growth and the crop yields would be further improved.

The primary purpose of this invention is to provide a means of quickly developing soil structure by synthetic additives. A further purpose of this invention is to provide a means of increasing the agricultural yield of soils, and particularly of soils of poor normal structure. A still further purpose is to provide a means of preventing erosion on exposed soil surfaces. A still further purpose of this invention is to provide synthetic substances which permit the simultaneous improvement in the erosion characteristics of the soil and in the development of suitable cover crops.

Soils of permanently good structure have the fine soil particles agglomerated into larger bodies or crumbs, which permit ready access of the air to their interstices and which at the same time retain moisture in an available form within the body of the crumbs. Soil of this structure will not lose moisture excessively by evaporation due to the insulation effect of the spaces or non-capillary pores containing air of high humidity which prevent excessive capillary action. Such soil does not shrink and form fissures and cracks on drying and retains a natural surface mulch which reduces evaporation. Thus, the optimum moisture and air content may be retained over long periods of time.

The use of this invention in the development of good soil structure by synthetic additives will be practicable in a wide variety of applications. It is useful in the rapid improvement of garden soils, especially in areas where infertile subsoil has been exposed. It is also useful in the improvement of average soils, and especially in areas where organic fertilizers are not available. It is also useful to enable the growth of root crops in areas where the closely compacted clay soil prevents the normal development of such crops. It is further useful in semi-arid regions where retention of soil moisture and minimization of solar evaporation are desirable. It is also useful in growing cover crops on road shoulders, filled areas and graded embankments where erosion control is needed until the cover crops become well-established. Furthermore, the invention is useful in the prevention of erosion in areas where surface vegetation has been destroyed by natural phenomena or by misuse of soils. Further benefits of the present invention which result from the improvements in the normal soil structure are also contemplated.

In accordance with this invention it has been found that soils, and particularly clays and silty loam soils of poor structure, can be substantially improved by the addition of traces of polyvinyl alcohols or other linear polymers containing a substantial number of alcoholic hydroxyl radicals appended thereto. Polymers of this type are prepared by the hydrolysis of vinyl esters and will usually contain some of the vinyl ester groups in unhydrolyzed form. Thus, the useful class of polymers may contain in polymeric form a large number of groupings resembling the monomeric substance from which the polymer was formed, for example vinyl acetate, vinyl propionate and vinyl butyrate. The polymer which is hydrolyzed to form the polyvinyl alcohol may not necessarily be a homopolymer of a vinyl ester but may be a copolymer of the vinyl ester with a substantial but usually a minor proportion of another monomer copolymerizable therewith, for example acrylonitrile, acrylic acid, methacrylic acid, the alkyl esters of acrylic acid and methacrylic acid, vinyl chloride, vinylidene chloride, vinyl ethers, maleic acid, the mono or dialkyl maleates, fumaric acid, the mono or dialkyl fumarates, and other monomers from which hydrolyzable copolymers can be prepared.

An essential requisite of the polymers and copolymers containing alcoholic hydroxyl substituents is water-solubility, and for this reason a substantial number of the alcoholic groups are required. Too few alcohol groups may result in water-insolubility, although water-solubility may also be influenced by the comonomer present in polymeric form. For example, acrylic acid, methacrylic acid, maleic acid, fumaric acid and the various vinyl alkyl ethers favor water-solubility, whereas the alkyl esters and hydrocarbons favor water-insolubility. The number of hydroxyl radicals present in the linear polymer chains may vary widely, and the maximum number required to induce sufficient water-solubility may also vary with the nature of the comonomer, the extent of hydrolysis of the polymeric vinyl ester and other chemical and physical characteristics of the polymers. It has been found that if the polymeric vinyl alcohol is at least partially water-soluble in either hot or cold water it will be useful in the practice of this invention.

The class of compounds useful in the practice of this invention may be described by the structural formula:

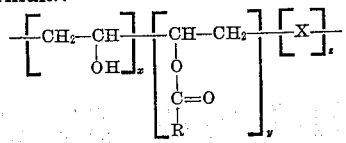

wherein R is a radical of the group consisting of hydrogen and alkyl radicals having up to three carbon atoms, X is a radical derived by polymerization of a monomer copolymerizable with the vinyl esters and $x$, $y$ and $z$ represent the relative proportions of vinyl alcohol, vinyl ester and other monomers, respectively, and $x+y+z=1$ (one). The $z$ radical may vary from zero (0) to 20 per cent of the total monomer in the copolymers, and $x$ will represent a substantial proportion of the monomers in the copolymer, whereas $y$ is relatively smaller than $x$ and indicative of the unhydrolyzed ester present in the polymeric alcohol.

The compounds useful in the practice of this invention are available as commercial polymers and in general are known as "polyvinyl alcohols." The practice of this invention also contemplates the use of many types of polymers not commercially available but only those which are encompassed by the above structural formula definition of linear polymeric vinyl alcohols.

In the practice of this invention the polymeric vinyl alcohols may be added to the soil to the extent of from 0.001 to 2.0 per cent by weight of the tillable top soil, but optimum results are usually obtained by the use of from 0.01 to 0.2 per cent by weight. The optimum results are usually affected by the molecular weight of the polymer, for example molecular weights of at least 10,000 are usually required. Preferably the minimum molecular weight should be at least 15,000, but optimum results are obtained if the molecular weight runs from 30,000 to 100,000. The invention is practicable with even higher molecular weight polymeric alcohols but no further increase in efficiency is observed, and sometimes where the excessive molecular weight is due to cross-linking a slight reduction of the efficiency of the compound may be noticed. With very high molecular weight polyvinyl alcohols the viscosity of the aqueous solutions is such that dispersion in the soil and dissolution in soil water are more difficult.

The polymers may be added directly to the soils if desired, but it is usually more feasible to add the polymers with a diluent or extender, which may be a solvent, for example water, or a solid carrier, such as peat moss, limestone, sand, clay, mineral fertilizer, silage or other fertilizing or soil improving substances. When added with a plant nutrient cooperative beneficial effects are noted in the rate of growth of crops on the treated soil. Soils improved by the fertilizer containing the polymers enable more rapid and abundant crop growth than can be obtained by the use of fertilizer alone. The utilization by the plants of any of the known fertilizer materials containing basic nutrients, such as nitrogen, phosphorus, and potassium, as well as trace elements, such as boron, manganese, magnesium, molybdenum, cobalt and iron, may be improved by the addition of the structure improving polymers described above.

The polymers may have chemically reactive groups, for example acid anhydride, carboxyl, hydroxyl or other groups which may combine with the various acidic or basic components added thereto. For example, the metal salts or lime of the fertilizing composition may react with the acidic polymer groups; similarly, the hydroxyl or amino radicals of the polymers may combine with the acidic fertilizer radicals. Polymers modified by these incidental collateral reactions are intended to be included as part of this invention.

Optimum improvement of soil structure is rapidly obtained if the polymer is thoroughly mixed with the soil by spading, cultivating, disking, harrowing, or other methods commonly used in agricultural art. However, desirable improvements may be obtained by simply adding the polymeric materials in aqueous solution or as a dry powder with or without diluents or carriers to the surface of the soil. In the latter case the polymeric substance becomes slowly mixed with the soil by normal cycles of wetting and drying, freezing and thawing and the like.

The availability of oxygen to plant roots in soil in the presence of various amounts of water is conveniently measured by the technique of Webley, Quastel et al., described in detail in the Journal Agricultural Science, 37, 257 (1947). In this procedure a microorganism such as yeast is substituted for plant roots and the rate of utilization of oxygen by the yeast suspended in a glucose solution is measured in a Warburg apparatus by a manometric method. The carbon dioxide evolved in the metabolic process is absorbed by potassium hydroxide in a center well so that the change in gas volume is caused by oxygen utilized by the yeast and soil microorganisms. The oxygen uptake by the same amount of yeast under optimum conditions is obtained from a well-shaken suspension of yeast in glucose solution in the absence of soil crumbs. Although the oxygen consumption of naturally occurring soil microorganisms is low compared with that of the relatively large amount of yeast used, it is measured by the absorption of oxygen in a Warburg flask containing soil and glucose solution but no yeast.

Soils in good tilth retain their porous crumb structure in the presence of large amounts of water. The yeast suspension in water is therefore spread over a large surface and oxygen can diffuse through the relatively thin films of water. High oxygen uptake by yeast is obtained on this type of soil. Soils of poor structure break down to a mud as the amount of water is increased and much less oxygen can diffuse through the thick water films. Thus, the oxygen uptake by yeast in this type of soil is much lower. By this technique, therefore, the effect of added materials on soil structure can be measured by measuring the rate of respiration of yeast in contact with soil crumbs under controlled condition. The rate of respiration is expressed as the aeration factor (A. F.) where:

$$A.\ F. = \frac{\text{Rate of oxygen uptake by yeast in soil crumbs} \times 100}{\text{Rate of oxygen uptake by yeast in shaken glucose solution}}$$

Soils with good structure give high A. F. values while soils with poor structure give low A. F. values.

More precise measurements of aggregate stability of soils are provided with a wet-sieving technique as described in the examples. Soil aggregates must have sufficient stability to maintain their identity when subjected to such dispersive actions as raindrop impact, tillage operations, percolating water, and the compressive forces of the overlying soil mass. Measurement of aggregate stability has therefore been used by soil physicists as one means of evaluating soil structure.

The presence of water-stable aggregates results in a combination of capillary and non-capillary pores, whereas a soil of poor structure has few non-capillary pores. The looseness and porosity in a soil composed of stable aggregates permits the rapid infiltration of water and rapid percolation of excess water downward through the soil. The soil regains the condition of optimum aeration soon after rainfall ceases.

The moisture content of the soil after free drainage under the influence of gravity has removed excess water in non-capillary pores is termed "field capacity" and closely approximates the moisture equivalent which is readily determined in the laboratory. Treatment of the soil with hydrophilic polymers raises the moisture equivalent significantly and therefore the treated soil retains a higher percentage of the water which percolates through it after a rainfall. That this extra water is not held at the expense of proper aeration may be demonstrated by the "aeration factor."

The wilting point, that is, the moisture content of the soil at which plants are no longer able to extract sufficient water from the soil, determines the lower limit of water available for plant growth. The vinyl alcohol polymers do not affect the wilting point of the soil significantly. Since the moisture equivalent is increased while the wilting point is unchanged, treatment of soil with the polymers results in a substantial increase in the amount of water retained by the soil and available for plant use.

The increased infiltration and percolation exhibited by soils composed of water-stable aggregates results in reduced runoff during a rainfall and therefore reduced erosion by running water. The aggregates, by virtue of their size and weight, are less readily carried by water and in addition are more stable to the destructive action of raindrops.

The rate of evaporation of water from the surface is affected by soil structure and also by the presence of organic colloids in the soil. A soil of good structure, such as is obtained by proper treatment of a soil with one of the polyvinyl alcohols and composed of water-stable aggregates, has in addition to capillary pores a large number of non-capillary pores. The action of these non-capillary pores is to break the continuity of the capillary pores to slow down movement of moisture by capillary action. The transference of capillary water to the surface of the soil is slowed down and therefore the loss of moisture by evaporation from the surface is reduced.

The "working properties" or consistency of a soil are influenced by the state of aggregation of the soil. Soil of poor structure, when treated with a hydrophilic polymer, loses its stickiness and becomes loose and crumbly, becomes plastic at a higher water content and compared to the untreated soil behaves generally as if it were at a lower moisture content.

The polyvinyl alcohols described above are useful in preventing erosion even where plant growth is not the principal consideration. Thus, the compounds may be used on barren soils, which are unusually susceptible to erosion. Furthermore, it may be used in conjunction with herbicides for treatment of road shoulders, fire lanes in forested areas or other earth surfaces, where growth of vegetation is undesired and erosion is a serious problem. The herbicide is blended with the polymer to the extent of from ten to 90 per cent of each, depending upon the requirements of the situation, type of plant to be destroyed and the natural structure of the soil, and applied to the plant surfaces or the soil in the area to be treated. The polymers and herbicide mixtures have a unique synergistic effect in that the polymers serve as adhesive to keep the herbicide in contact with plant surface and after washing off assist in the improvement of soil structures.

Further details of the invention are set forth with respect to the following specific examples:

EXAMPLE 1

One hundred gram portions of air-dry alluvial soil of poor structure were treated with 25 ml. of aqueous solutions containing one gram of polyvinyl alcohol. Sufficient water was added in small portions until the soil reached the sticky point. The soil was allowed to dry and broken up and crumbs from two to four mm. in size were separated by sieving. Four-gram portions were used in each Warburg flask for evaluation of the structure by the method of Webley and Quastel. The data is summarized in Table I.

Table I

| Additive | Percent acetate in polymer | Visc. (4% H₂O soln.) | Aeration factors at various moisture contents | | | |
|---|---|---|---|---|---|---|
| | | | 25% | 37.5% | 50% | 62.5% |
| None | | | 83 | 55 | (a) | (a) |
| One (1) percent polyvinyl alcohol | 0.3 | 50 | 104 | 96 | 63 | 6 |
| One (1) percent polyvinyl alcohol | 37 | 40 | 106 | 68 | 46 | 30 | a Soil completely waterlogged, no measurable uptake of oxygen.

EXAMPLE 2

To 100 grams of Miami silt loam was added 20 ml. of an aqueous solution containing 0.02 or 0.1 gram of polyvinyl alcohol. The solution was allowed to soak into the soil and then the moist soil was mixed well with a pastry blender. An additional ten ml. of distilled water was added and mixed into the soil. The treated soil was forced through a four mm. sieve to form crumbs and then allowed to dry. Forty-gram portions of the dry crumbs were evaluated by wet-sieving to determine aggregate stability. The wet-sieving technique was essentially that of Yoder described in J. Am. Soc. Agron. 28, 337 (1936). The effect of viscosity average molecular weight on the aggregate stability obtained is shown in Table II.

Table II

| Percent of polyvinyl acetate in polymer | Molecular weight | Viscosity (cps.) (4% aq. soln.) | Aggregates >0.25 mm. at two conc. of "PVA"* | |
|---|---|---|---|---|
| | | | 0.02% | 0.1% |
| 5 | 10,700 | 1.5 | 11 | 40 |
| 5 | 24,000 | 4.6 | 27 | 64 |
| 5 | 35,300 | 7-9 | 36 | 90 |
| 7 | 59,000 | 20-25 | 40 | 95 |
| 4 | 71,900 | 40-50 | 46 | 94 |

*Polyvinyl alcohol.

In general the aggregate-stabilizing effect increased as the extent of hydrolysis of the polyvinyl acetate increased. This is illustrated in Table III for a series of samples of the same aqueous viscosity.

Table III

| Percent of polyvinyl acetate in polymer | Viscosity (cps.) (4% aq. soln.) | Aggregates >0.25 mm. at two conc. of "PVA"* | |
|---|---|---|---|
| | | 0.02% | 0.1% |
| 1.7 | 40-50 | 49 | 95 |
| 4 | 40-50 | 46 | 94 |
| 18 | 40-50 | 44 | 88 |
| 26 | 40-50 | 41 | 94 |

*Polyvinyl alcohol.

EXAMPLE 3

Moisture equivalents were determined according to the method of Bouyoucos as described in Soil Sci. 40, 165–171 (1935). Wilting point determinations were made by the method of Breazeale and McGeorge as described in Soil Sci. 68, 371–4 (1949). The effect of polyvinyl alcohol polymers upon the moisture equivalent, wilting point and amount of water held by soil available for plant use are shown in Table IV.

Table IV

| Percent polyvinyl acetate in polymer | Visc. (cps.) (4% aq. soln.) | Conc. on soil (percent) | Moisture equivalent | Wilting point | Increase in moisture available to plants (percent) |
|---|---|---|---|---|---|
| (1) | (1) | (1) | 24.2 | 7.6 | |
| 8 | 88 | 0.02 | 25.3 | | 5.4 |
| 8 | 88 | .1 | 26.9 | 7.2 | 16.2 |
| 20 | 20-25 | .02 | 26.7 | | 15.0 |
| 20 | 20-25 | .1 | 27.1 | 7.5 | 17.5 |

1 Control with untreated soil.

EXAMPLE 4

Soil crumbs prepared in Example 1 using one per cent of polyvinyl alcohol with 0.3 per cent of polyvinyl acetate in polymer were placed in a perfusion apparatus described by Lees and Quastel and subjected to the continuous action of percolating water. The crumbs showed little breakdown after more than two years of constant perfusion with water. Crumbs prepared without polyvinyl alcohol broke down to a mud within a few minutes after they became wet and stopped the percolating action. The details and use of the perfusion apparatus are described in Chem. and Ind. 63 at page 238 (1944).

What we claim is:

1. The method of improving the tilth of soils of the group consisting of clay-containing soils, silt-containing soils, and soils containing both clay and silt, which comprises dispersing in the soil a small amount, not to exceed 2% by weight, of a substantially linear water-soluble olefinic polymer represented by the structural formula

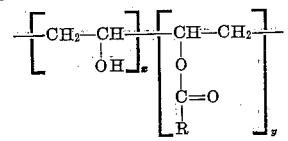

wherein R is a radical of the group consisting of hydrogen and alkyl radicals having up to 3 carbon atoms, and x and y are numbers which represent the proportions of alcohol and ester units, respectively, present in the polymer.

2. The method of improving the tilth of clay-containing soils, which comprises dispersing in the soil a small amount, not to exceed 2% by weight, of a substantially linear water-soluble polymer of a vinyl ester of a carboxylic acid having up to 4 carbon atoms and having a substantial number of carboxylate radicals converted to alcoholic hydroxyl groups.

3. The method of improving the tilth of clay-containing soils which comprises dispersing in the soil a small amount, not to exceed 2% by weight, of a substantially linear polymer of vinyl acetate substantially hydrolyzed to a water-soluble polymeric alcohol.

4. The method of improving the tilth of clay-containing soils which comprises dispersing in the soil a small amount, not to exceed 2% by weight, of a water-soluble polyvinyl alcohol.

5. The method of improving the tilth of clay-containing soils, which comprises dispersing in the soil a small amount, not to exceed 2% by weight, of a substantially linear water-soluble polymer of a vinyl ester of a carboxylic acid having up to 4 carbon atoms and having a molecular weight of at least 10,000 and a substantial number of carboxylate radicals converted to alcoholic hydroxyl groups.

6. The method of improving the tilth of clay-containing soils which comprises dispersing in the soil a small amount, not to exceed 2% by weight, of a substantially linear polymer of vinyl acetate substantially hydrolyzed to a water-soluble polymeric alcohol, said polymer having a molecular weight of at least 10,000.

7. The method of improving the tilth of clay-containing soils which comprises dispersing in the soil a small amount, not to exceed 2% by weight, of a water-soluble polyvinyl alcohol having a molecular weight of at least 10,000.

ROSS M. HEDRICK.
DAVID T. MOWRY.

References Cited in the file of this patent
Du Pont, "Elvanol," 1947, page 7, Du Pont Co.